(12) United States Patent
Murakami et al.

(10) Patent No.: US 8,950,547 B2
(45) Date of Patent: Feb. 10, 2015

(54) ENGINE MUFFLER

(71) Applicant: Honda Motor Co., Ltd., Tokyo (JP)

(72) Inventors: Hiroko Murakami, Wako (JP); Hiroshi Mizuguchi, Wako (JP); Shohei Kono, Wako (JP); Yoshinobu Kondo, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 14/220,192

(22) Filed: Mar. 20, 2014

(65) Prior Publication Data

US 2014/0284138 A1    Sep. 25, 2014

(30) Foreign Application Priority Data

Mar. 21, 2013    (JP) ................. 2013-057527

(51) Int. Cl.
| | |
|---|---|
| *F01N 1/02* | (2006.01) |
| *F01N 13/18* | (2010.01) |
| *F01N 1/08* | (2006.01) |
| *F01N 1/00* | (2006.01) |
| *F01N 13/00* | (2010.01) |

(52) U.S. Cl.
CPC ............ *F01N 1/089* (2013.01); *F01N 13/1838* (2013.01); *F01N 13/1888* (2013.01); *F01N 1/083* (2013.01); *F01N 1/084* (2013.01); *F01N 2230/04* (2013.01); *F01N 2340/00* (2013.01); *F01N 2450/00* (2013.01); *F01N 2450/22* (2013.01); *F01N 2470/02* (2013.01); *F01N 2470/18* (2013.01); *F01N 2490/06* (2013.01)
USPC ......................................... 181/272; 29/890.08

(58) Field of Classification Search
USPC ......... 181/272, 275, 281, 282, 258, 243, 269, 181/252, 256; 29/890.08
See application file for complete search history.

(56) References Cited

U.S. PATENT DOCUMENTS

| | | | | |
|---|---|---|---|---|
| 3,841,435 | A | * | 10/1974 | Hetherington ................ 181/266 |
| 3,987,868 | A | * | 10/1976 | Betts ............................. 181/269 |
| 4,045,057 | A | * | 8/1977 | Halter ............................. 285/49 |
| 4,064,963 | A | * | 12/1977 | Kaan et al. .................... 181/244 |
| 4,124,091 | A | * | 11/1978 | Mizusawa ..................... 181/231 |
| 4,475,622 | A | * | 10/1984 | Tsunoda et al. .............. 181/227 |
| 4,514,151 | A | * | 4/1985 | Anders et al. ................ 417/540 |
| 4,689,952 | A | * | 9/1987 | Arthur et al. ................... 60/313 |

(Continued)

FOREIGN PATENT DOCUMENTS

| | | | | | |
|---|---|---|---|---|---|
| JP | 59170417 | A | * | 9/1984 | ............... F01N 1/12 |
| JP | 05288047 | A | * | 11/1993 | ............... F01N 3/24 |

(Continued)

*Primary Examiner* — Edgardo San Martin
(74) *Attorney, Agent, or Firm* — Westerman, Hattori, Daniels & Adrian, LLP (57) ABSTRACT

An engine muffler includes a cylindrical muffler body whose interior is partitioned by at least one partition plate in a longitudinal direction of the muffler body into a plurality of expansion chambers. The muffler body is constructed of a plurality of divided muffler body members divided from each other in the longitudinal direction at the position of the partition plate, and a gap is provided between opposed end portions of the divided muffler body members. The partition plate has an annular section held in fitting engagement with the inner peripheral surface of at least one of the opposed end portions, and it is positioned in such a manner as to close the gap. The opposed end portions are welded, from a radially outward direction, to the outer peripheral surface of the annular section along their respective entire perimeters.

3 Claims, 9 Drawing Sheets

(56) References Cited

U.S. PATENT DOCUMENTS

| | | | |
|---|---|---|---|
| 4,745,988 A * | 5/1988 | Hardt et al. | 181/249 |
| 4,848,513 A * | 7/1989 | Csaszar | 181/265 |
| 5,020,631 A * | 6/1991 | DeVille | 181/249 |
| 5,148,597 A * | 9/1992 | Weeks | 29/890.08 |
| 6,070,695 A * | 6/2000 | Ohtaka et al. | 181/282 |
| 6,089,348 A * | 7/2000 | Bokor | 181/272 |
| 6,341,662 B1 * | 1/2002 | Karlsson | 181/230 |
| 6,990,804 B2 * | 1/2006 | Jacob et al. | 60/299 |
| 7,062,908 B2 * | 6/2006 | Yamamoto | 60/299 |
| 7,669,694 B2 * | 3/2010 | Seon | 181/269 |
| 7,931,120 B2 * | 4/2011 | Nishimura et al. | 181/258 |
| 7,934,583 B2 * | 5/2011 | Reuther et al. | 181/282 |
| 8,104,571 B2 * | 1/2012 | Nakajima | 181/252 |
| 8,205,716 B2 * | 6/2012 | Wirth | 181/269 |
| 8,220,587 B2 * | 7/2012 | Mori et al. | 181/251 |
| 8,701,824 B2 * | 4/2014 | Hayama et al. | 181/228 |
| 2002/0023799 A1 * | 2/2002 | Schlossarczyk et al. | 181/254 |
| 2010/0037593 A1 * | 2/2010 | Kozal | 60/282 |
| 2010/0230205 A1 * | 9/2010 | Kobayashi et al. | 181/259 |

FOREIGN PATENT DOCUMENTS

| | | |
|---|---|---|
| JP | 2989791 B2 | 12/1999 |
| JP | 2004-92462 A | 3/2004 |

* cited by examiner

ENGINE MUFFLER

TECHNICAL FIELD

The present disclosure relates to a technique for quality improvement of a muffler for connection to an exhaust port of a general-purpose engine.

BACKGROUND

In recent years, environmental requirements have requested us to purify, with catalysts, exhaust gas discharged from a general-purpose engine mounted on a working machine. However, in many cases, an exhaust pipe passage in a small-sized general-purpose engine is smaller in length than an exhaust pipe passage in a vehicle, such as a four-wheeled automotive vehicle or a motorcycle. Thus, a catalyst layer has to be provided in the interior of a small-sized muffler. Examples of a muffler for a general-purpose engine are know from Japanese Patent Application Laid-open Publication No. 2004-92462 (hereinafter referred to as "Patent Literature 1") disclosing a construction including a catalyst layer and from Japanese Patent No. 2989791 (hereinafter referred to as "Patent Literature 2") disclosing a construction including no catalyst layer.

In the muffler disclosed in Patent Literature 1, a partition plate is interposed between two divided muffler body members to define two expansion chambers in the interior of the muffler body, and an exhaust gas purifier is provided in an exhaust gas flow passage between the two expansion chambers. Flanges are formed on divided surfaces of the muffler body, and the above-mentioned partition plate is fixed to the individual flanges by caulking, brazing, screwing or otherwise. The exhaust gas purifier is coated with catalysts.

Further, in the muffler disclosed in Patent Literature 2, a partition plate is interposed between two divided muffler body members to define two expansion chambers in the interior of the muffler body. Flanges are formed on divided surfaces of the muffler body, and the above-mentioned partition plate is sandwiched between and integrally fixed to the individual flanges with one of the flanges folded back onto the other flange.

However, in order to enhance efficiency of purification by the catalysts, it is necessary to set an exhaust pipe length within the muffler in such a manner that temperature of exhaust gas passing through the catalyst layer falls in an active temperature range of the catalysts. Further, in order to enhance muffling performance of the muffler, it is necessary to set optimal capacity of the plurality of expansion chambers as well as the exhaust pipe length.

Namely, an appropriate length of the exhaust pipe and capacity of each of the plurality of expansion chambers within the muffler have to be set separately for each of exhaust characteristics of various general-purpose engines. For that purpose, there arises a need to change sizes (dimensions) of individual component parts of a muffler for each of exhaust characteristics of various general-purpose engines. Therefore, it is preferable to enhance a degree of dimensioning design freedom and at the same time secure sufficient quality of the muffler.

SUMMARY

In view of the foregoing prior art problems, it is preferable to provide a technique which is capable of securing sufficient quality of an engine muffler while enhancing a degree of dimensioning design freedom of the engine muffler.

In order to accomplish the above-mentioned object, one aspect of the present disclosure provides an improved engine muffler, which comprises: a cylindrical muffler body; and at least one partition plate partitioning the interior of the muffler body in a longitudinal direction of the muffler body into a plurality of expansion chambers, the muffler body being constructed of a plurality of divided muffler body members divided from each other in the longitudinal direction at the position of the partition plate, a gap being provided between opposed end portions of the plurality of divided muffler body members, the partition plate having an annular section held in fitting engagement with the inner peripheral surface of at least one of the opposed end portions of the plurality of divided muffler body members, the partition plate being disposed in such a manner as to close the gap. The opposed end portions of the plurality of divided muffler body members are welded, from a radially outward direction of the muffler body, to the outer peripheral surface of the annular section along respective entire perimeters thereof.

Accordingly, by appropriately changing the respective lengths of the plurality of divided muffler body members, the plurality of expansion chambers can be readily set to optimal lengths and capacity at low cost. In this way, a degree of dimensioning design freedom of the engine muffler can be significantly enhanced. Further, the opposed end portions of the divided muffler body members are welded, from the radially outward direction of the muffler body, to the outer peripheral surface of the annular section along their respective entire perimeters. Thus, necessary welding operation can be performed with ease, and enhanced welding quality can be achieved. By virtue of the enhanced welding quality, it is possible to enhance airtightness between the expansion chambers and airtightness between the expansion chambers and the outside of the expansion chambers. Therefore, sufficiently high quality of the muffler can be secured.

Further, by changing the axial length of the annular section of the partition plate, it is also possible to change a distance from a mutually-welded position of the end portions of the plurality of divided muffler body members to the partition plate. In such a case, the partition plate can be changed in position in the longitudinal direction of the muffler body without the respective lengths of the divided muffler body members being changed. As a result, the present disclosure can set the lengths and capacity of the plurality of expansion chambers to optimal lengths and capacity, as necessary.

Namely, the present disclosure can freely and easily set and change the lengths and capacity of the plurality of expansion chambers by combining (stacking) the plurality of divided muffler body members in the longitudinal direction of the muffler body and welding, from the radially outward direction, the opposed end portions of the divided muffler body members to the outer peripheral surface of the annular section along their respective entire perimeters. Besides, the present disclosure can secure sufficiently high quality of the engine muffler.

Preferably, in the engine muffler, the annular section has a flat flange portion formed integrally with and along an entire perimeter of an outer peripheral portion of the annular section to extend radially outward from the distal end of the outer peripheral portion of the annular section through the gap, and a cylindrical extension portion extending in an axial direction of the annular section from the radially outward end of the flange portion, the extension portion is located opposite from the outer peripheral portion across the flange portion and held in fitting engagement with an outer peripheral surface of other of the opposed end portions. The opposed end portions of the divided muffler body members are welded, from the radially outward direction, to the outer peripheral surface of the annular section along the respective entire perimeters by the one of the opposed end portions being welded, from the radially outward direction, to the flange portion along the entire perimeter thereof and by the other of the opposed end portions being welded, from the radially outward direction, to the extension portion along the entire perimeter thereof.

The annular section has the flange portion formed integrally with and along the entire perimeter of the annular section and extending radially outward from the distal end of the outer peripheral portion of the annular section, and the cylindrical extension portion extending in the axial direction of the annular section from the radially outward end of the flange portion through the gap. The one of the opposed end portions is welded, from the radially outward direction, to the flange portion along the entire perimeter thereof, while the other of the opposed end portions is placed in fitting engagement with the extension portion and welded, from the radially outward direction, to the extension portion along the entire perimeter thereof. By the one opposed end portion being placed in fitting engagement with the annular section and the other of the opposed end portion being placed in fitting engagement with the extension portion, the respective centers of the opposed end portions can be aligned with each other easily and accurately. Besides, the opposed end portions can be easily welded, from the radially outward direction, to the annular section along their respective entire perimeters. Thus, necessary welding operation can be performed with ease, and enhanced welding quality can be achieved. By virtue of the enhanced welding quality, it is possible to even further enhance airtightness between the expansion chambers and airtightness between the expansion chambers and the outside.

Preferably, in the engine muffler, the annular section has a flat flange portion formed integrally with and along the entire perimeter of an outer peripheral portion of the annular section to extend radially outward from the distal end of the outer peripheral portion of the annular section through the gap. The opposed end portions of the divided muffler body members are welded to the outer peripheral surface of the annular section along the respective entire perimeters by being welded, from the radially outward direction, to the flange portion along the respective entire perimeters thereof.

The annular section has the flange portion formed integrally with and along the entire perimeter of the outer peripheral portion of the annular section and extending radially outward from the distal end of the outer peripheral portion of the annular section, the flange portion extending through the gap. Thus, the opposed end portions can be easily welded, from the radially outward direction, to the flange portion along their respective entire perimeters. Thus, necessary welding operation can be performed with ease, and enhanced welding quality can be achieved. As a result, it is possible to even further enhance airtightness between the expansion chambers and airtightness between the expansion chambers and the outside.

Preferably, in the engine muffler, the plurality of expansion chambers comprise first, second and third expansion chambers sequentially arranged in the longitudinal direction, and the at least one partition plate comprises first and second partition plates, the first partition plate partitioning between the first expansion chamber and the second expansion chamber, the second partition plate partitioning between the second expansion chamber and the third expansion chamber. The engine muffler of the present disclosure further comprises a communication pipe extending between the first partition plate and the second partition plate, the communication pipe having a catalyst layer provided therein and having a longitudinally-halfway portion communicating with the second expansion chamber, the communication pipe having one end portion communicating with the first expansion chamber and joined to the first partition plate along an entire perimeter thereof, the communication pipe having another end portion slidably fitted in a through-hole formed in the second partition plate, the other end portion of the communication pipe and the through-hole being covered with a cap from the side of the third expanded chamber, the cap being joined to the second partition plate in a sealed condition.

The one end portion of the communication pipe having the catalyst layer provided therein is in communication with the first expansion chamber and joined to the first partition plate along its entire perimeter. The other end portion of the communication pipe is slidably fitted in the through-hole formed in the second partition plate. With the one end portion of the communication pipe constructed as a fixed end and the other end portion of the communication pipe constructed as a free end as above, thermal expansion of the communication pipe relative to the distance between the first partition plate and the second partition plate can be absorbed easily and reliably.

Further, the other end portion of the second communication pipe and the through-hole of the second partition plate are covered with the cap from the side of the third expanded chamber, and the cap is joined to the second partition plate in a sealed condition. Thus, although the other end portion of the second communication pipe is slidably fitted in the through-hole, the present disclosure can secure sufficiently high airtightness between the second expansion chamber and the third expanded chamber.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION

First Embodiment

Figure 1:
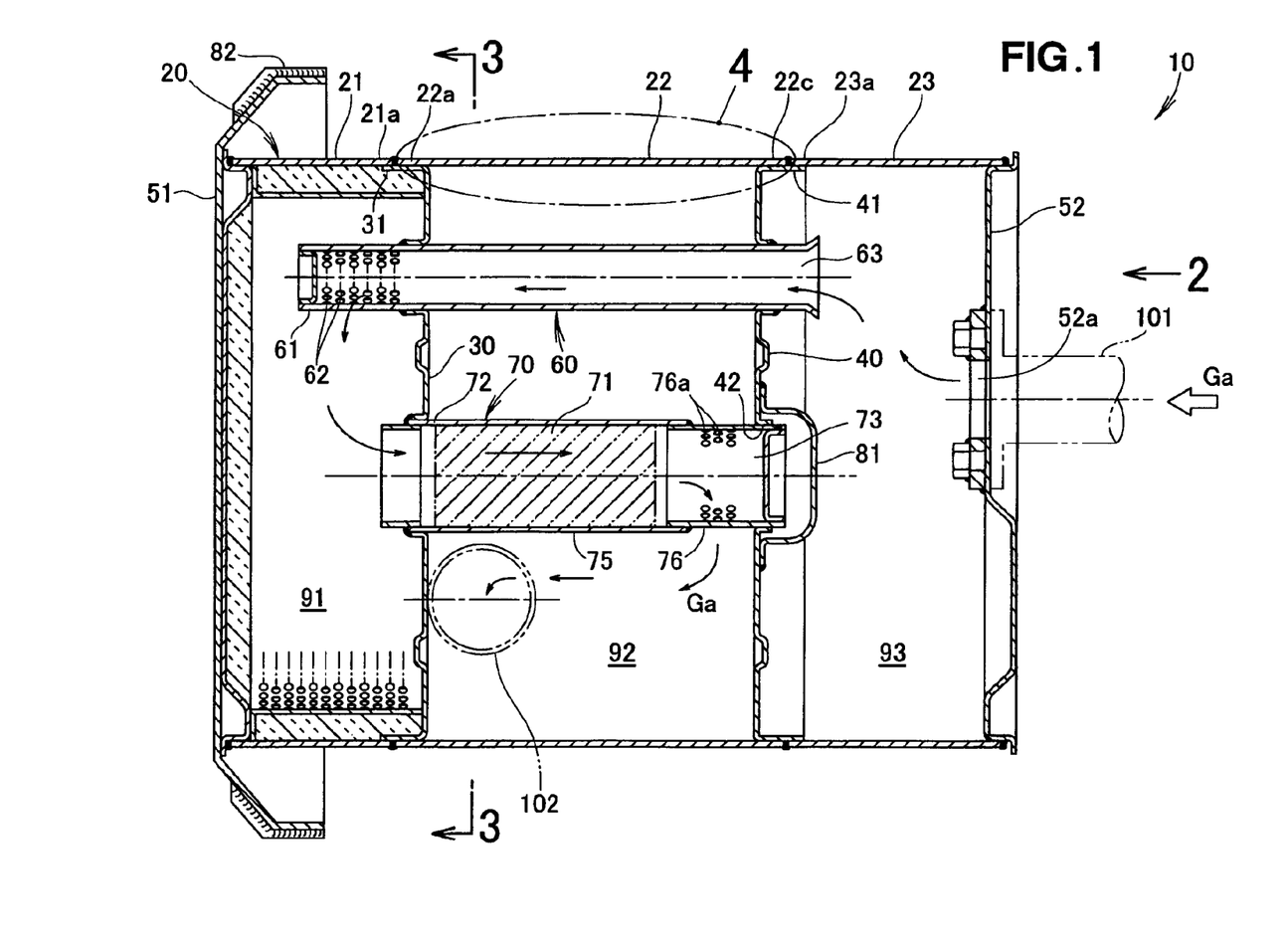
FIG. 1 is a sectional view showing a first embodiment of an engine muffler of the present invention.
Figure 2:
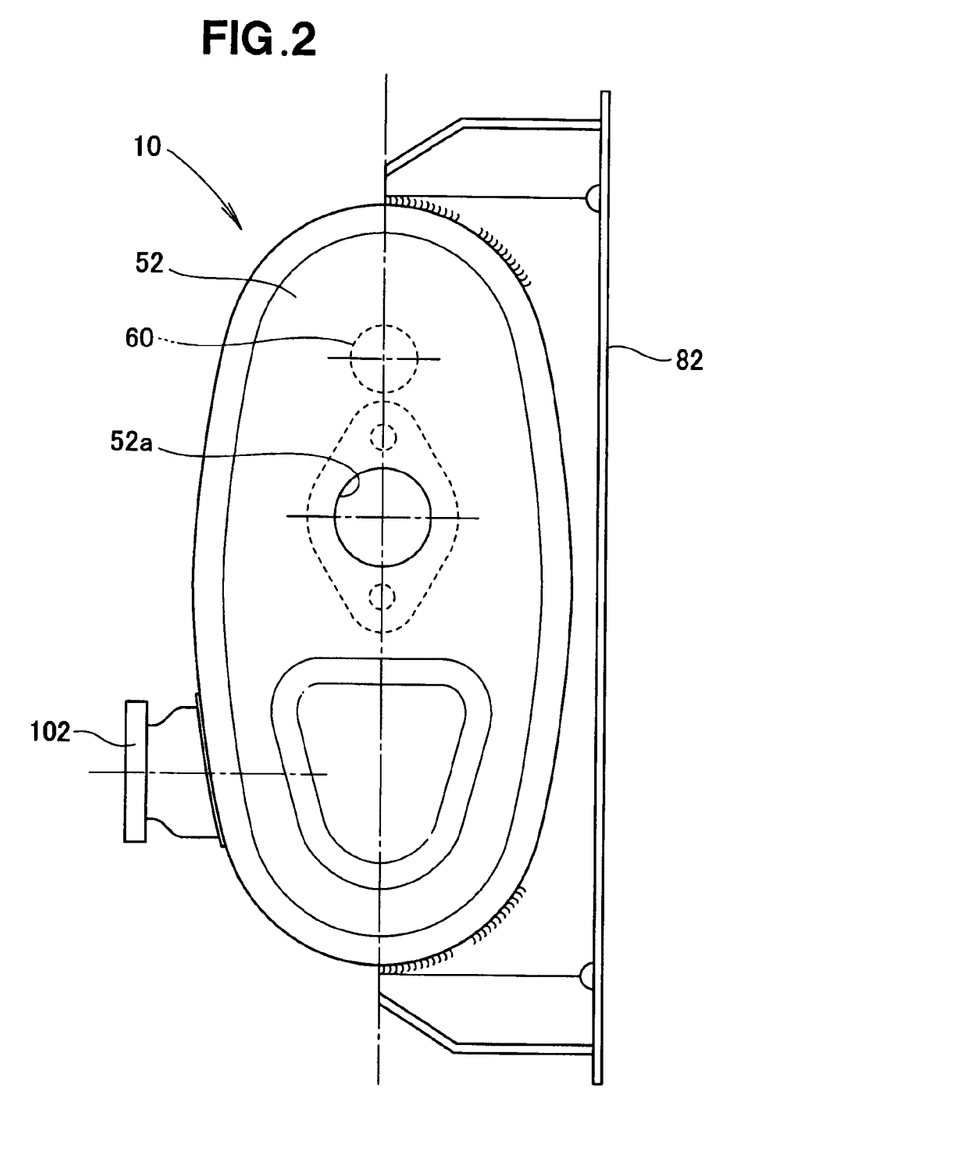
FIG. 2 is a view taken in a direction of arrow 2 of FIG. 1.
Figure 3:
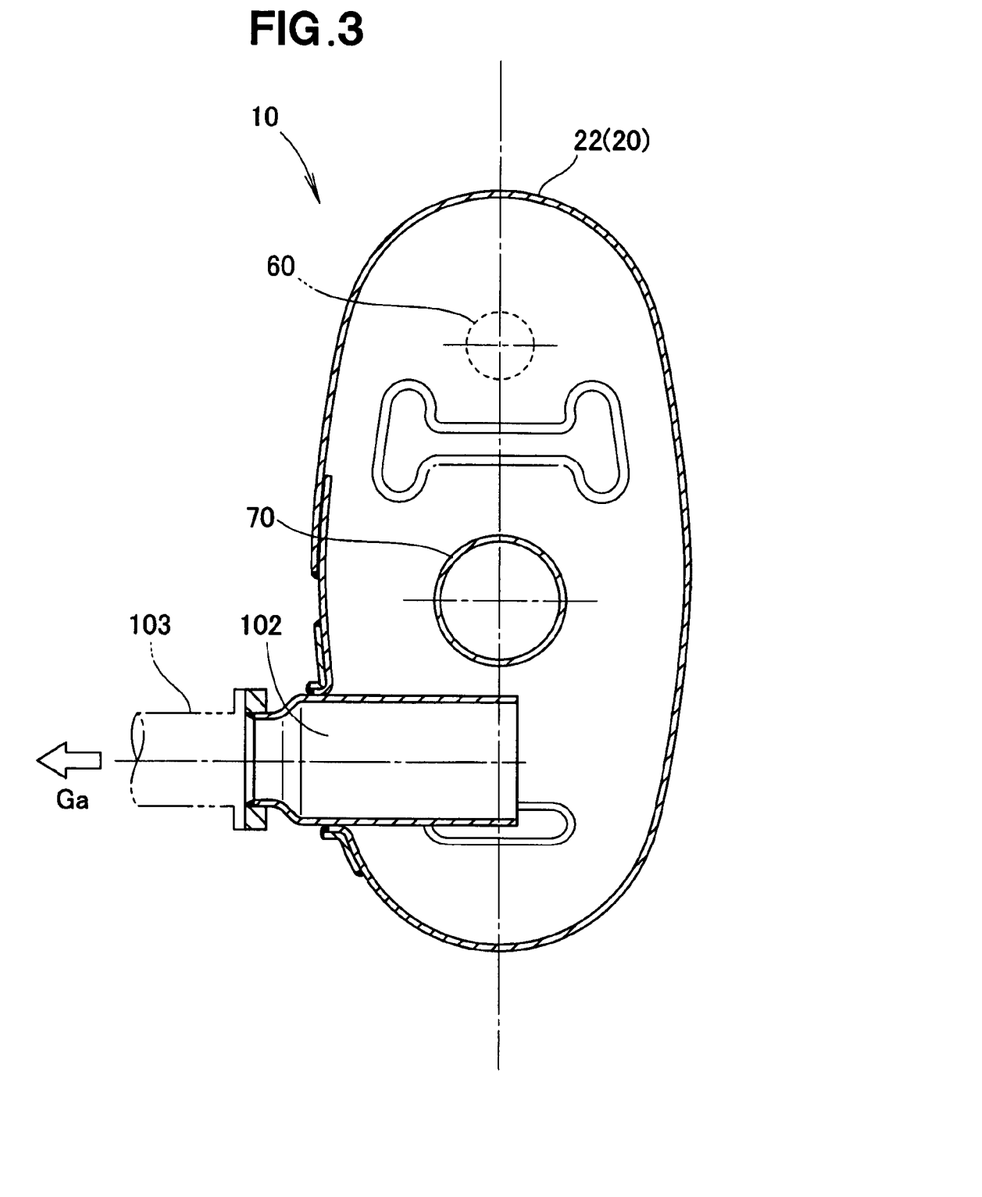
FIG. 3 is a sectional view taken along the 3-3 line of FIG. 1.

As shown in FIGS. 1 to 3, a first embodiment of an engine muffler 10 of the present invention, which is suited for muffling exhaust sound of a not-shown general-purpose engine, has a single muffler body 20 whose interior is partitioned longitudinally (in a longitudinal direction of the muffler body 20) by at least one partition plate (e.g., two partition plates 30 and 40 in the illustrated example of FIG. 1) into a plurality of expansion chambers 91 to 93. The engine muffler 10 will hereinafter be referred to simply as "muffler 10".

More specifically, the muffler 10 includes the single muffler body 20, the two partition plates 30 and 40, two end plates 51 and 52 closing the opposite ends of the muffler body 20, and one cap 81. Further, the muffler 10 has a bracket 82 for mounting on a desired member.

The muffler body 20 is in the form of a cylinder of a generally circular (such as elliptical, oblong or right circular) sectional shape, and the interior is partitioned longitudinally by the two partition plates 30 and 40 into the plurality of expansion chambers 91 to 93.

The plurality of expansion chambers 91 to 93 are three, i.e. first, second and third, expansion chambers 91 to 93 that are sequentially arranged in the longitudinal direction in the order they were mentioned. For example, the first expansion chamber 91 is located adjacent to the first end plate 51, the third expansion chamber 93 is located adjacent to the second end plate 52, and the second expansion chamber 92 is located between the first and third expansion chambers 91 and 93. The second expansion chamber 92 has an exhaust inlet port 52*a* having an exhaust pipe 101 of the general-purpose engine connected thereto, and the exhaust pipe 101 is in communication with the third expansion chamber 93.

The two, i.e. first and second, partition plates 30 and 40 are each in the form of a generally flat plate member. The first partition plate 30 partitions between the first and second expansion chambers 91 and 92, and the second partition plate 40 partitions between the second and third expansion chambers 92 and 93.

Figure 4:
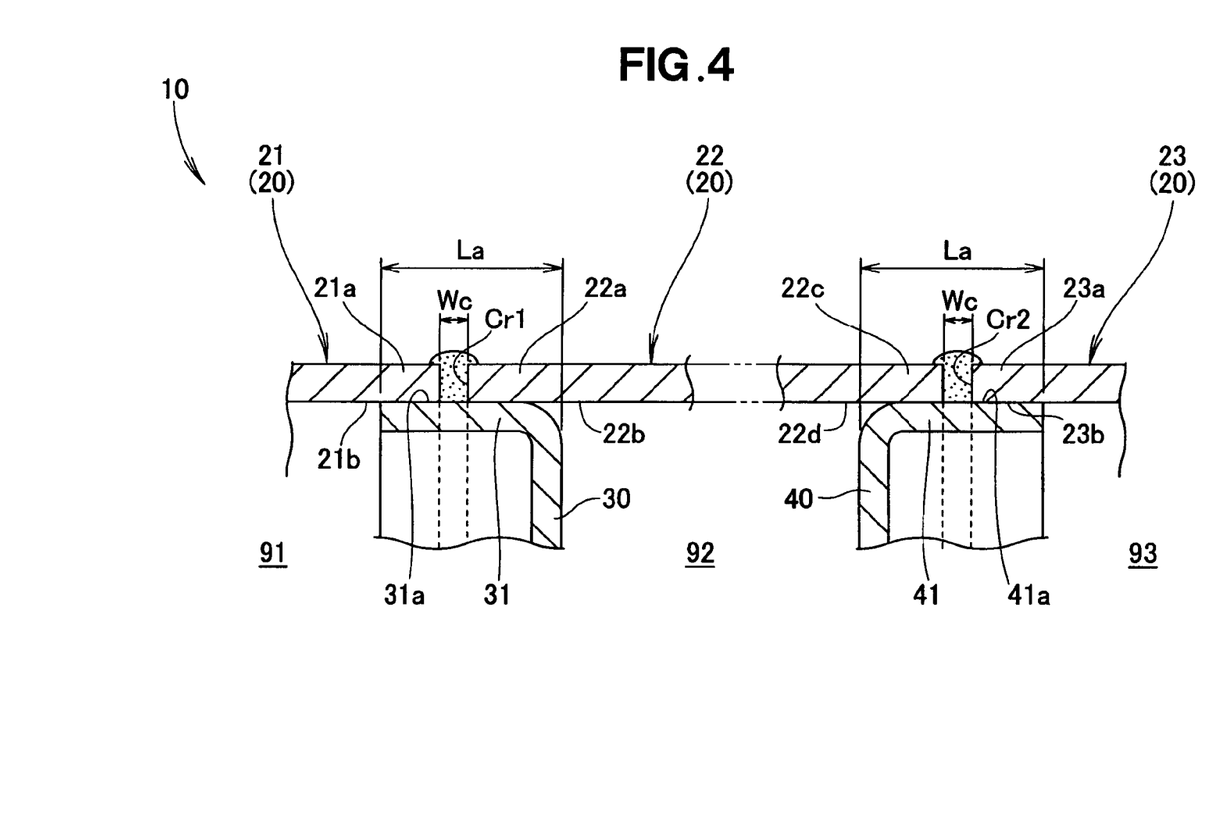
FIG. 4 is a view of a section encircled at 4 in FIG. 1.
Figure 5:
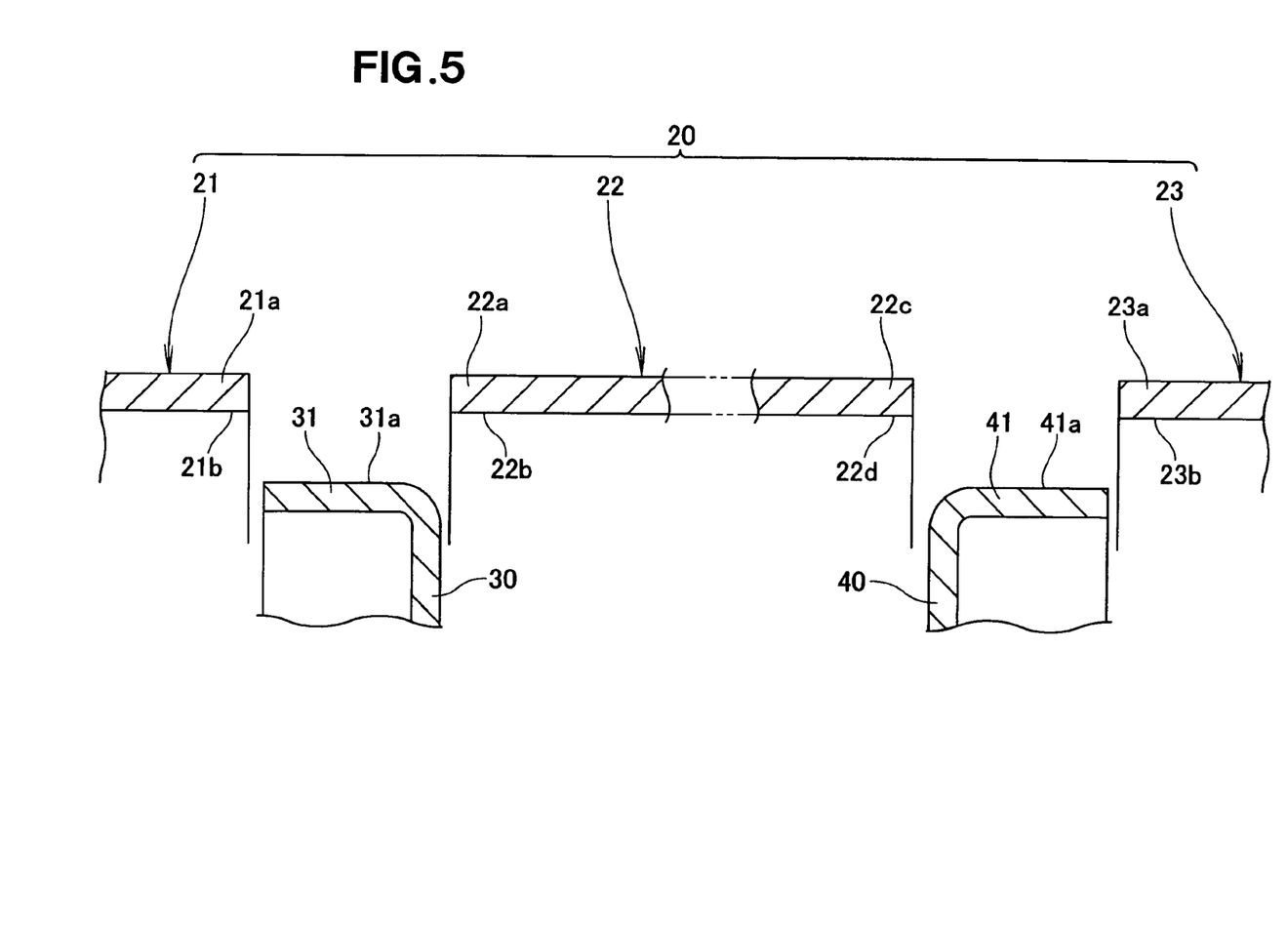
FIG. 5 is an exploded view of a plurality of divided muffler body members and partition plates shown in FIG. 4.

As shown in FIGS. 1, 4 and 5, the muffler body 20 is constructed of a plurality of divided muffler body members 21 to 23 divided from one another in the longitudinal direction of the muffler body 20 at the positions of the partition plates 30 and 40. The plurality of divided muffler body members 21 to 23 are three, i.e. first to third, divided muffler body members 21 to 23 that are sequentially arranged in the longitudinal direction in the order mentioned.

The first divided muffler body member 21 defines the first expanded chamber 91, the second divided muffler body member 22 defines the second expanded chamber 92, and the third divided muffler body member 23 defines the third expanded chamber 93.

The first expanded chamber 91 is a sealed space surrounded by the first divided muffler body member 21, the first partition plate 30 and the first end plate 51. The second expanded chamber 92 is a sealed space surrounded by the second divided muffler body member 22, the first partition plate 30 and the second partition plate 40. The third expanded chamber 93 is a sealed space surrounded by the third divided muffler body member 23, the second partition plate 40 and the second end plate 52.

As shown in FIGS. 1 and 3, the second divided muffler body member 22 has an exhaust outlet port 102 formed therein. The exhaust outlet port 102 extends in a direction perpendicularly intersecting the longitudinal direction of the muffler body 20; more specifically, the exhaust outlet port 102 comprises a pipe extending into the second expanded chamber 92. For example, the exhaust outlet port 102 is connected to a tail pipe 103 (FIG. 3) for emitting exhaust gas to the atmosphere.

The following describe a joint construction by which the plurality of divided muffler body members 21 to 23 are joined to one another at their opposed end portions 21*a* and 22*a* and 22*c* and 23*a*. As shown in FIGS. 1, 4 and 5, gaps Cr1 and Cr2 are formed between the opposed end portions 21*a* and 22*a* of the first and second divided muffler body members 21 and 22 and between the opposed end portions 22*c* and 23*a* of the second and third divided muffler body members 22 and 23. The gaps Cr1 and Cr2 are set at the same size. Further, the opposed end portions 21*a* and 22*a* and 22*c* and 23*a* of the divided muffler body members 21 to 23 are joined together along with the partition plates 30 and 40, respectively.

More specifically, the first shield plate 30 has an annular section 31 (first annular section 31) held in fitting engagement with the inner peripheral surface 22*b* of at least one of the opposed end portions 21*a* and 22*a* of the first and second divided muffler body members 21 and 22. Preferably, the first annular section 31 is held in fitting engagement with the inner peripheral surfaces 21*b* and 22*b* of both of the opposed end portions 21*a* and 22*a* of the first and second divided muffler body members 21 and 22. The first annular section 31 is positioned in such a manner as to close the first gap Cr1. Further, the opposed end portions 21*a* and 22*a* are welded, from a radially outward direction of the muffler body 20, to the outer peripheral surface 31*a* of the first annular section 31 along their respective entire perimeters.

Likewise, the second shield plate 40 has an annular section 41 (second annular section 41) held in fitting engagement with the inner peripheral surface 22*d* of at least one of the opposed end portions 22*c* and 23*a* of the second and third divided muffler body members 22 and 23. Preferably, the second annular section 41 is held in fitting engagement with the inner peripheral surfaces 22*d* and 23*b* of both of the opposed end portions 22*c* and 23*a* of the second and third divided muffler body members 22 and 23. The second annular section 41 is positioned in such a manner as to close the second gap Cr2. Further, the opposed end portions 22*c* and 23*a* are welded, from the radially outward direction, of the muffler body 20 to the outer circumferential surface 41*a* of the second annular section 41 along their respective entire perimeters.

The annular sections 31 and 41 each have the same length that is greater than a width We of each of the gaps Cr1 and Cr2. The first partition plate 30 having the first annular section 31 and the second partition plate 40 having the second annular section 41 each have a generally flat-bottomed dish shape, and the first and second partition plates 30 and 40 are oriented in mutually opposite directions.

Thus, in the instant embodiment, by appropriately changing the lengths of the plurality of divided muffler body members 21 to 23, the plurality of expansion chambers 91 to 93 can be readily set to optimal lengths and capacity at low cost. Therefore, a degree of dimensioning design freedom of the muffler 10 can be significantly enhanced. Further, the opposed end portions 21*a* and 22*a* and 22*b* and 23*a* of the divided muffler body members 21 to 23 are welded, from the radially outward direction, to the outer peripheral surfaces 31*a* and 41*a* of the first and second annular sections 31 and 41 along their respective entire perimeters. Thus, necessary welding operation can be performed with ease, and enhanced welding quality can be achieved. By virtue of the enhanced welding quality, it is possible to enhance airtightness between the expansion chambers 91 to 93 and airtightness between the expansion chambers 91 to 93 and the outside. Therefore, sufficiently high quality of the muffler 10 can be secured.

Further, as shown in FIG. 1, two, i.e. first and second, communication pipes 60 and 70 extend between the first and second partition plates 30 and 40. The first communication pipe 60 communicate the first expansion chamber 91 and the third expansion chamber 93, and the second communication pipe 70 communicate the first expansion chamber 91 and the second expansion chamber 92. The first communication pipe 60, the exhaust inlet port 52a, the second communication pipe 70 and the exhaust outlet port 102 are sequentially arranged in a long axis direction of the oblong section of the muffler body 20 in the order mentioned (see FIGS. 2 and 3).

The first communication pipe 60 is a pipe of a circular cross-sectional shape. The first communication pipe 60 has one end portion 61 extending through the first partition plate 30 into the first expansion chamber 91 and joined to the first partition plate 30 along its entire perimeter. The first communication pipe 60 is closed at the distal end of the one end portion 61. A multiplicity of small-diameter flow passage holes 62 are formed in a peripheral wall of the one end portion 61, so that the interior of the first communication pipe 60 and the first expansion chamber 91 are in communication with each other via the flow passage holes 62.

The first communication pipe 60 has another end portion 63 extending through the second partition plate 40 into the third expansion chamber 93 and joined to the second partition plate 40 along its entire perimeter. The distal end of the other end portion 63 opens into the third expansion chamber 93.

Figure 6:
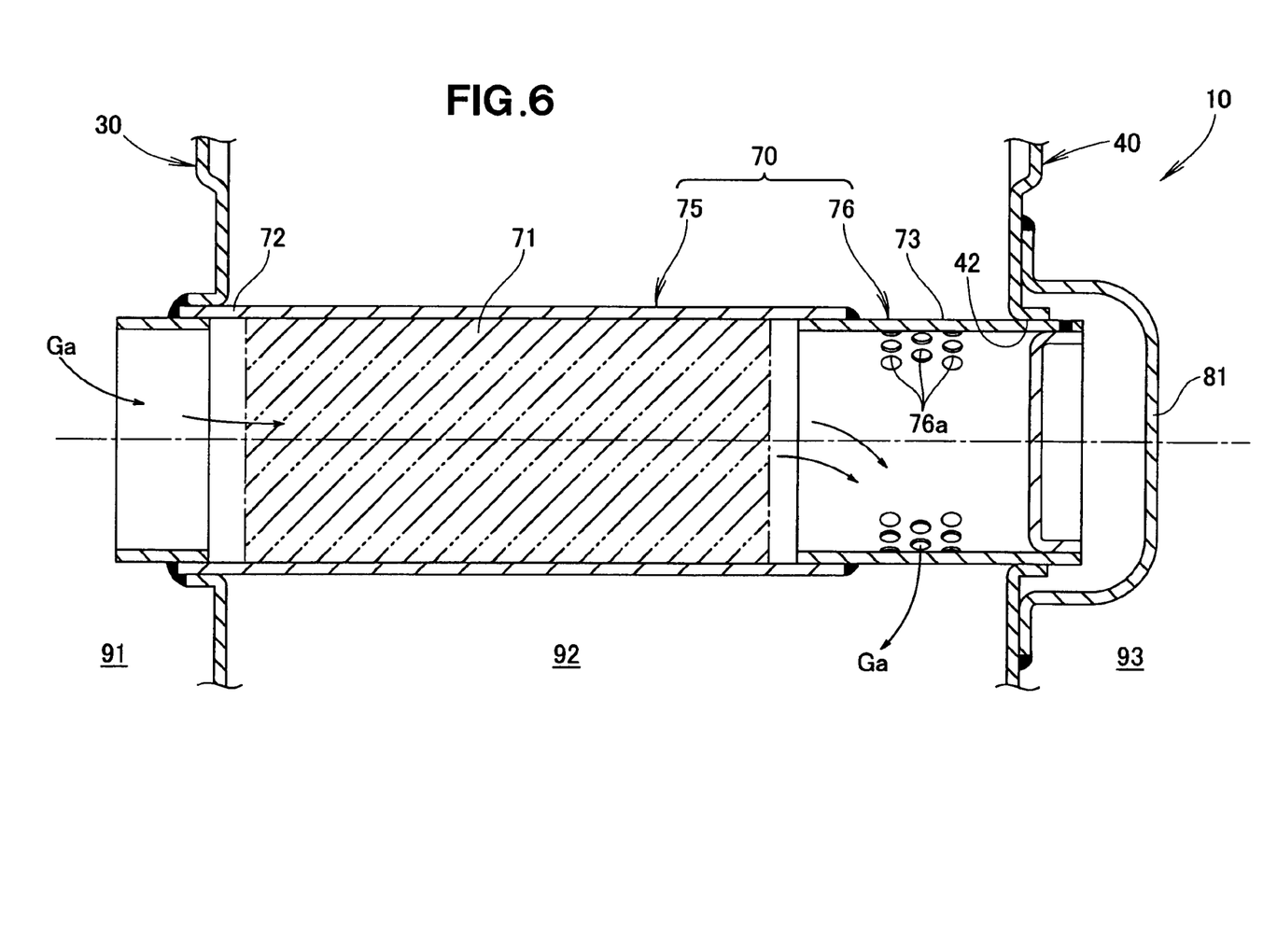
FIG. 6 is an enlarged view showing a second communication pipe and other elements around the second communication pipe shown in FIG. 1.

Further, as shown in FIGS. 1 and 6, the second communication pipe 70 is a pipe of a circular cross-sectional shape, which has a catalyst layer 71 provided therein and has its longitudinally-halfway portion communicating with the second expansion chamber 92. The second communication pipe 70 has one end portion 72 communicating with the first expansion chamber 91 and joined to the first partition plate 30 along its entire perimeter. The second communication pipe 70 has another end portion 73 slidably fitted in a through-hole 42 formed in the second partition plate 40. The other end portion 73 of the second communication pipe 70 and the through-hole 42 are covered with the cap 81 from a longitudinally outward direction, i.e. from the side of the third expanded chamber 93. The cap 81 is joined to the second partition plate 40 in a sealed condition.

The catalyst layer 71 (i.e., exhaust gas purifier 71) comprises various catalysts selected in view of components of exhaust gas and filled in the second communication pipe 70. The catalyst layer 71 comprises, for example, metal catalysts. The metal catalysts employed in the instant embodiment are of a conventionally-known construction where a thin plate and a corrugated plate are superposed on each other, rolled and brazed so as to form a honeycomb structure having a multiplicity of mesh-shaped passages and where the outer peripheral surface of the honeycomb structure is covered with an outer cylinder and then the outer peripheral surface of the honeycomb structure and the outer cylinder are brazed together.

More specifically, the second communication pipe 70 comprises a main pipe 75 joined at its one end portion to the first partition plate 30, and an auxiliary pipe 76 integrally connected at its one end portion to another end portion of the main pipe 75 and joined at its another end portion to the second partition plate 40. The main pipe 75 has the catalyst layer 71 provided therein. The one end portion of the main pipe 75 (i.e., one end portion 72 of the second communication pipe 70) is in communication with the first expansion chamber 91 and joined along its entire perimeter to the first partition plate 30. Further, the one end portion of the auxiliary pipe 76 (i.e., other end portion 73 of the second communication pipe 70) is fitted in the through-hole 42, formed in the second partition plate 40, in such a manner as to be slidable in the longitudinal direction of the muffler body 20. The one end portion of the auxiliary pipe 76 is closed at its distal end. A multiplicity of small-diameter flow passage holes 76a are formed in a peripheral wall of the auxiliary pipe 76 (i.e., peripheral wall of the second communication pipe 70), so that the interior of the auxiliary pipe 76 (interior of the second communication pipe 70) is in communication with the second expansion chamber 92 via the flow passage holes 76a.

With the one end portion 72 of the second communication pipe 70 constructed as a fixed end and the other end portion 73 of the second communication pipe 70 constructed as a free end as above, thermal expansion of the second communication pipe 70 relative to a distance between the first partition plate 30 and the second partition plate 40 can be absorbed easily and reliably.

Further, the other end portion 73 of the second communication pipe 70 and through-hole 42 are covered with the cap 81 from the side of the third expanded chamber 93, and the cap 81 is joined (welded) to the second partition plate 40 in a sealed condition. Thus, although the other end portion 73 of the second communication pipe 70 is slidably fitted in the through-hole 42, the instant embodiment can secure sufficiently high airtightness between the second expansion chamber 92 and the third expanded chamber 93.

Further, as shown in FIG. 1, sound of exhaust gas Ga having flown in through the exhaust inlet port 52a can be attenuated or silenced by the exhaust gas Ga passing through the third expanded chamber 93, the first communication pipe 60, the first expanded chamber 91, the second communication pipe 70, the second expanded chamber 92 and the exhaust outlet port 102. Also, the exhaust gas Ga having flown in through the exhaust inlet port 52a can be purified by passing through the catalyst layer 71.

Figure 7A:
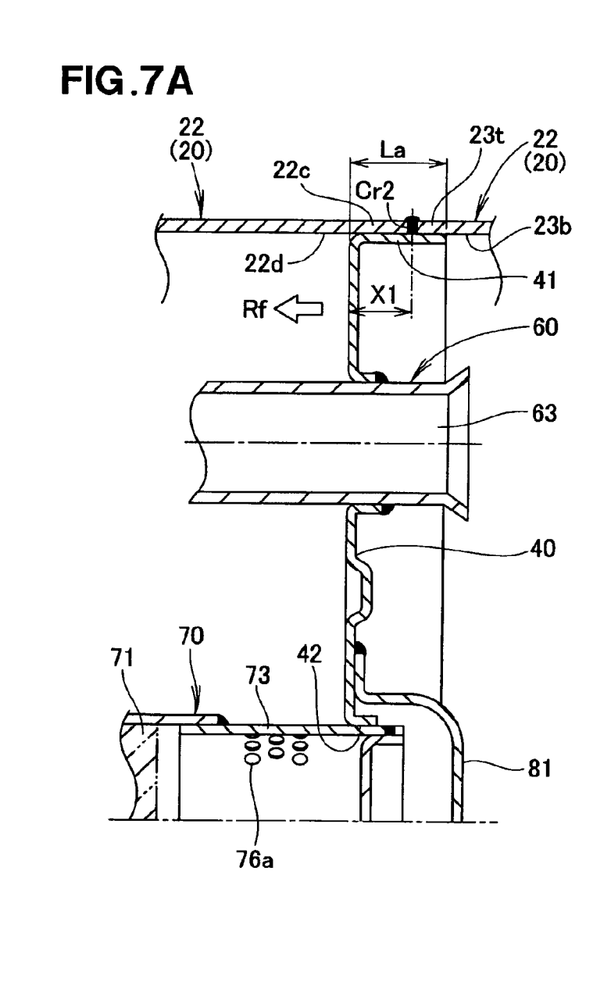
FIGS. 7A and 7B are sectional views showing the second and third divided muffler body members, second partition plate, second communication pipe, cap and other elements around them shown in FIG. 1.
Figure 7B:
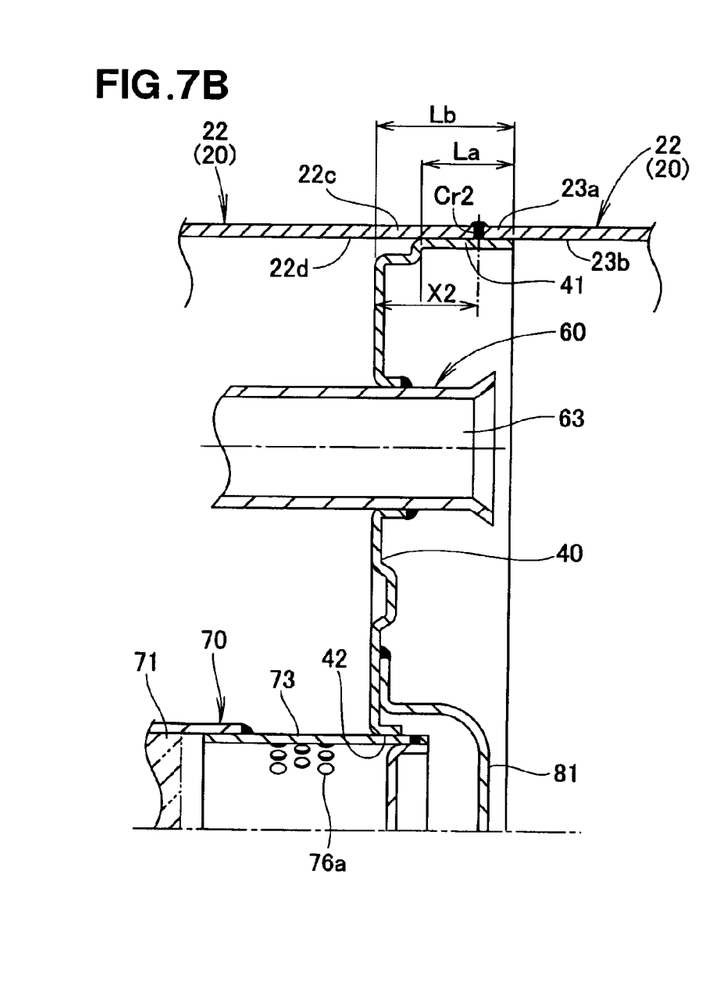

FIG. 7A shows in enlarged scale relationship between the annular section 41 of the second partition plate 40 and the opposed end portions 22c and 23a of the second and third divided muffler body members 22 and 23. FIG. 7B shows the second partition plate 40 having been moved or displaced toward the second expanded chamber 92 as indicated by a white arrow Rf. By such displacement of the second partition plate 40 toward the second expanded chamber 92, it is possible to not only reduce the length and capacity of the second expanded chamber 92 while increasing the length and capacity of the third expanded chamber 93. In this case, it is only necessary to change the second annular section 41 of the second partition plate 40 from a length La shown in FIG. 7A to a length 7b shown in FIG. 7B. Note that the length of the first communication pipe 60 may be changed in response to the displacement of the second partition plate 40.

Namely, by changing the length La of the second annular section 41 of the second partition plate 40, it is also possible to change a distance X1 from a mutually-welded position of the end portions 22c and 23a of the second and third divided muffler body members 22 and 23 to the second partition plate 40 to a distance X2. In such a case, the position of the second partition plate 40 can be changed in the longitudinal direction of the muffler body 20 without the respective lengths of the second and third divided muffler body members 22 and 23 being changed. As a result, it is possible to set, as necessary, the lengths and capacity of the second and third expansion chambers 92 and 93 to optimal lengths and capacity.

The same can also be said for relationship between the second and third divided muffler body members 22 and 23 and the first partition plate 30 shown in FIG. 1, although a description about such relationship between the second and third divided muffler body members 22 and 23 and the first partition plate 30 is omitted here to avoid unnecessary duplication.

Second Embodiment

Next, a second embodiment of the engine muffler 10A of the present invention will be described with reference to FIG. 8. Only features of the second embodiment of the engine muffler 10A different from the features of the first embodiment of the engine muffler 10 shown in FIGS. 1 to 7 will be described hereinbelow to avoid unnecessary duplication.

More specifically, the second embodiment of the engine muffler 10A is characterized in that a joint construction by which the opposed end portions 22c and 23a of the second and third divided muffler body members 22 and 23 and the second partition plate 40 are joined is modified from that in the first embodiment of the engine muffler 10. Also, a construction by which the opposed end portions 21a and 22a of the first and second divided muffler body members 21 and 22 and the first partition plate 30 are joined is modified from that in the first embodiment of the engine muffler 10.

Figure 8A:
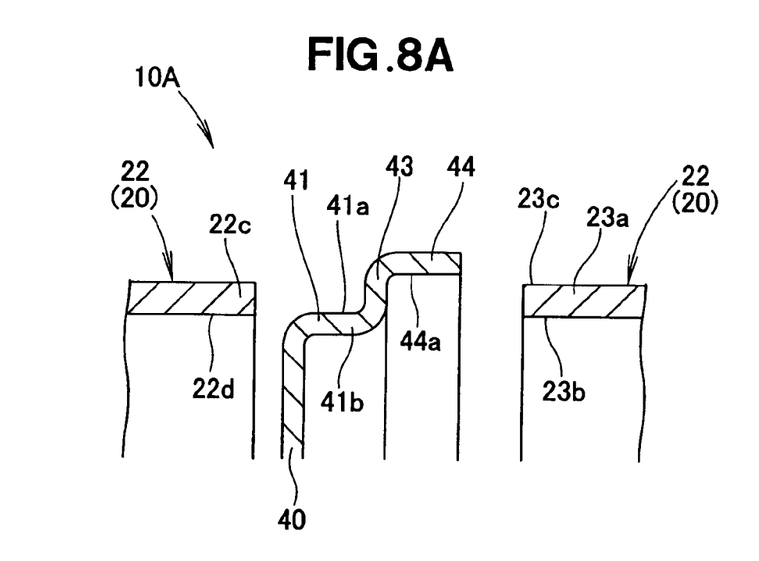
FIGS. 8A and 8B are sectional views explanatory of a joint construction by which opposed end portions of the second and third divided muffler body members and the second partition plate are joined together in a second embodiment of the engine muffler of the present invention.
Figure 8B:
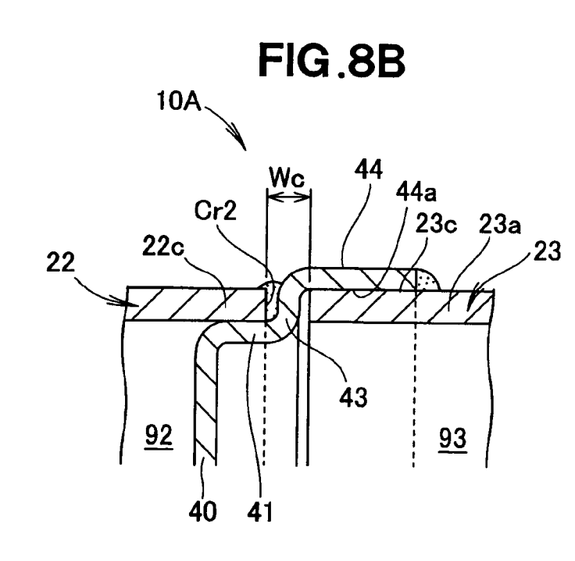

FIG. 8A is an exploded view showing the second and third divided muffler body members 22 and 23 and the second partition plate 40 in a disassembled state, and FIG. 8B shows the second and third divided muffler body members 22 and 23 and the second partition plate 40 in an assembled state.

In the second embodiment, the second annular section 41 of the second partition plate 40 has a flat flange portion 43 formed integrally with and along the entire perimeter of an outer peripheral portion 41b of the second annular section 41 and extending radially outward from the distal end of the outer peripheral portion 41b of the second annular section 41, and a cylindrical extension portion 44 extending in the axial direction of the second annular section 41 from the radially outward end of the flange portion 43. The flange portion 43 extends through the gap Cr2. The extension portion 44 is located opposite from the outer peripheral portion 41b across the flange portion 43, and the inner peripheral surface 44a of the extension portion 44 is fittable with the outer peripheral surface 23c of the other end portion 23a of the opposed end portions 22c and 23a of the second and third divided muffler body members 22 and 23. Namely, in the assembled state, the inner peripheral surface 44a of the extension portion 44 is held in fitting engagement with the outer peripheral surface 23c of the other end portion 23a.

The one end portion 22c is welded, from the radially outward direction, to the flange portion 43 along its entire perimeter, and the other end portion 23a is welded, from the radially outward direction, to the extension portion 44 along its entire perimeter. As a consequence, the opposed end surfaces 22c and 23a are welded to the outer peripheral surface 41a of the second annular section 41.

The second embodiment of the engine muffler 10A arranged in the aforementioned manner can achieve the same behavior and advantageous benefits as the first embodiment of the engine muffler 10. Further, with the second embodiment, where the one end portion 22c fits the second annular section 41 and the other end portion 23a fits the extension portion 44, the respective centers of the opposed end portions 22c and 23a can be aligned with each other easily and accurately. Besides, the opposed end portions 22c and 23a can be easily welded, from the radially outward direction, to the partition plate 40 along their respective entire perimeters. Thus, necessary welding operation can be performed with ease, and enhanced welding quality can be achieved. By virtue of the enhanced welding quality, it is possible to even further enhance airtightness between the expansion chambers 92 and 93 and airtightness between the expansion chambers 92 and 93 and the outside. Therefore, sufficiently high quality of the muffler 10 can be secured.

Third Embodiment

Next, a third embodiment of the engine muffler 10B of the present invention will be described with reference to FIG. 9, which is similar to the above-described second embodiment of the engine muffler 10A except for the following.

More specifically, the third embodiment of the engine muffler 10B is characterized in that the second annular section 41 does not have the extension portion 44 provided in the second embodiment 10A.

Figure 9A:
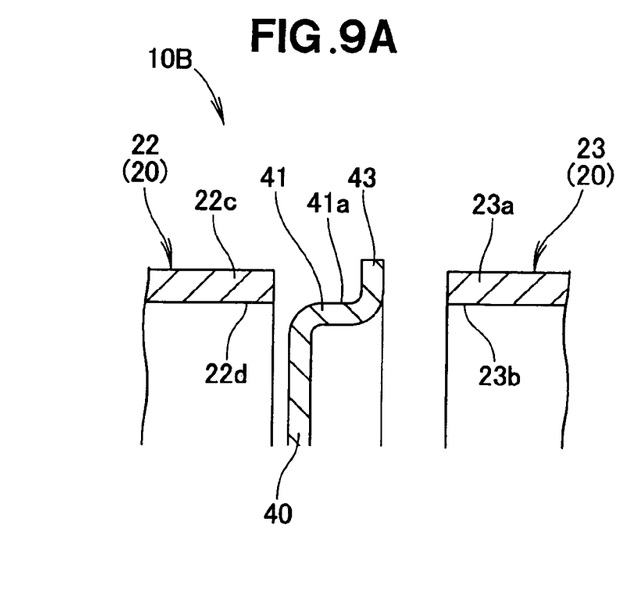
FIGS. 9A and 9B are sectional views explanatory of a joint construction by which the opposed end portions of the second and third divided muffler body members and the second partition plate are joined together in a third embodiment of the engine muffler of the present invention.
Figure 9B:
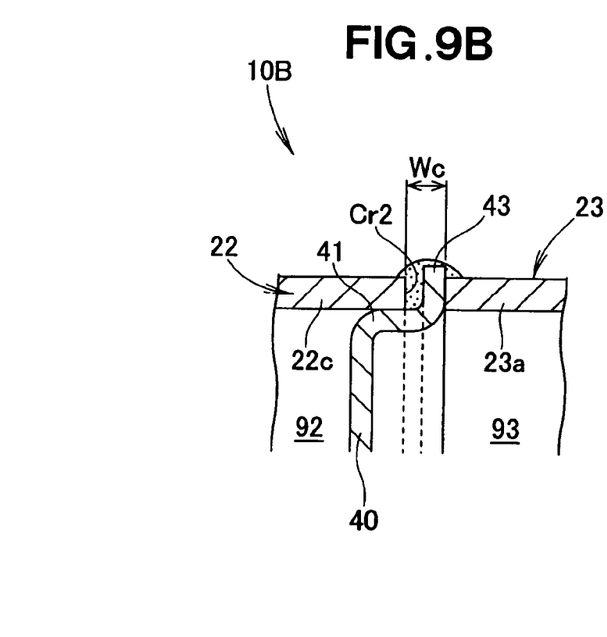

FIG. 9A is an exploded view showing the second and third divided muffler body members 22 and 23 and the second partition plate 40 in the disassembled state, and FIG. 9B shows the second and third divided muffler body members 22 and 23 and the second partition plate 40 in the assembled state.

In the third embodiment, as shown in FIG. 9A, the second annular section 41 of the second partition plate 40 has only the flat flange portion 43 formed integrally with and along the entire perimeter of the second annular section 41 and extending radially outward from the distal end of the outer peripheral portion 41b of the second annular section 41. The flange portion 43 extends through the gap Cr2. The opposed end portions 22c and 23a are welded, from the radially outward direction, to the flange portion 43 along their respective entire perimeters. As a consequence, the opposed end surfaces 22c and 23a are welded, from the radially outward direction, to the outer circumferential surface 41a of the second annular section 41 along their respective entire perimeters.

The third embodiment of the engine muffler 10B can achieve the same behavior and advantageous benefits as the first embodiment of the engine muffler 10. Further, with the third embodiment 10B, the opposed end portions 22c and 23a can be easily welded, from the radially outward direction, to the flange portion 43 along their respective entire perimeters. Thus, necessary welding operation can be performed with ease, and enhanced welding quality can be achieved. As a result, it is possible to enhance airtightness between the expansion chambers 92 and 93 and airtightness between the expansion chambers 92 and 93 and the outside.

The engine mufflers 10, 10A, 10B of the present disclosure are well suited for application to exhaust lines of general-purpose engines. Particularly the engine mufflers 10, 10A, 10B of the present disclosure prove to be useful in cases where a single electric power generator unit is constructed of a combination of a general-purpose engine, an electric power generator driven by the engine and the muffler and where the muffler is disposed in an extremely narrow space of the unit.

What is claimed is:

1. An engine muffler comprising:
   a cylindrical muffler body; and
   at least one partition plate partitioning an interior of the muffler body in a longitudinal direction of the muffler body into a plurality of expansion chambers, the muffler body being constructed of a plurality of divided muffler body members divided from each other in the longitudinal direction at a position of the partition plate, a gap being provided between opposed end portions of the plurality of divided muffler body members, the partition plate having an annular section held in fitting engagement with an inner peripheral surface of at least one of the opposed end portions of the plurality of divided muffler body members, the partition plate being disposed in such a manner as to close the gap, the opposed end portions of the plurality of divided muffler body members being welded, from a radially outward direction of the muffler body, to an outer peripheral surface of the annular section along respective entire perimeters thereof, wherein the annular section has a flat flange portion formed integrally with and along an entire perimeter of an outer peripheral portion of the annular section to extend radially outward from a distal end of the outer peripheral portion of the annular section through the gap, and a cylindrical extension portion extending in an axial direction of the annular section from a radially outward end of the flange portion, wherein the extension portion is located opposite from the outer peripheral portion across the flange portion and has an inner peripheral surface held in fitting engagement with an outer peripheral surface of other of the opposed end portions, and wherein the opposed end portions of the divided muffler body members are welded, from the radially outward direction, to the outer peripheral surface of the annular section along the respective entire perimeters by the one of the opposed end portions being welded, from the radially outward direction, to the flange portion along the entire perimeter thereof and by the other of the opposed end portions being welded, from the radially outward direction, to a distal end of the extension portion along the entire perimeter thereof.

2. An engine muffler comprising:

a cylindrical muffler body; and at least one partition plate partitioning an interior of the muffler body in a longitudinal direction of the muffler body into a plurality of expansion chambers, the muffler body being constructed of a plurality of divided muffler body members divided from each other in the longitudinal direction at a position of the partition plate, a gap being provided between opposed end portions of the plurality of divided muffler body members, the partition plate having an annular section held in fitting engagement with an inner peripheral surface of at least one of the opposed end portions of the plurality of divided muffler body members, the partition plate being disposed in such a manner as to close the gap, the opposed end portions of the plurality of divided muffler body members being welded, from a radially outward direction of the muffler body, to an outer peripheral surface of the annular section along respective entire perimeters thereof, wherein the annular section has a flat flange portion formed integrally with and along an entire perimeter of an outer peripheral portion of the annular section to extend radially outward from a distal end of the outer peripheral portion of the annular section through the gap, wherein the flat flange portion has a first surface and a second surface opposite to the first surface, the first surface being spaced from the one of the opposed end portions of the divided muffler body members in the longitudinal direction of the muffler body, the second surface being in contact with the other of the opposed end portions of the divided muffler body members, and wherein the opposed end portions of the divided muffler body members are welded to the outer peripheral surface of the annular section along the respective entire perimeters by being welded, from the radially outward direction, to the flange portion along the respective entire perimeters thereof.

3. An engine muffler comprising:

a cylindrical muffler body; and at least one partition plate partitioning an interior of the muffler body in a longitudinal direction of the muffler body into a plurality of expansion chambers, the muffler body being constructed of a plurality of divided muffler body members divided from each other in the longitudinal direction at a position of the partition plate, a gap being provided between opposed end portions of the plurality of divided muffler body members, the partition plate having an annular section held in fitting engagement with an inner peripheral surface of at least one of the opposed end portions of the plurality of divided muffler body members, the partition plate being disposed in such a manner as to close the gap, the opposed end portions of the plurality of divided muffler body members being welded, from a radially outward direction of the muffler body, to an outer peripheral surface of the annular section along respective entire perimeters thereof, wherein the plurality of expansion chambers comprise first, second and third expansion chambers sequentially arranged in the longitudinal direction, and the at least one partition plate comprises first and second partition plates, the first partition plate partitioning between the first expansion chamber and the second expansion chamber, the second partition plate partitioning between the second expansion chamber and the third expansion chamber, and wherein the engine muffler further comprises a communication pipe extending between the first partition plate and the second partition plate, the communication pipe having a catalyst layer provided therein and having a longitudinally-halfway portion communicating with the second expansion chamber, the communication pipe having one end portion communicating with the first expansion chamber and joined to the first partition plate along an entire perimeter thereof, the communication pipe having another end portion slidably fitted in a through-hole formed in the second partition plate, the communication pipe being slidably movable relatively to the second partition plate to accommodate a difference in thermal expansion in the longitudinal direction of the muffler body between the communication pipe and the divided muffler body members, and the other end portion of the communication pipe and the through-hole being covered with a cap from a side of the third expanded chamber, the cap being joined to the second partition plate in a sealed condition.

* * * * *